United States Patent
Krantz et al.

(10) Patent No.: US 6,387,334 B1
(45) Date of Patent: *May 14, 2002

(54) BALANCED FLOW RESISTANCE OCR DISTRIBUTOR CONE

(75) Inventors: William B. Krantz, Boulder, CO (US); David E. Earls, Pinole, CA (US); Harold J. Trimble, Panama City Beach, FL (US); Julie Chabot, Novato; Krishniah Parimi, Concord, both of CA (US)

(73) Assignee: Chevron U.S.A. Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,268

(22) Filed: Dec. 18, 1998

Related U.S. Application Data

(60) Provisional application No. 60/069,000, filed on Dec. 30, 1997.

(51) Int. Cl.⁷ ................. B01J 8/08; B01J 8/18
(52) U.S. Cl. ............. 422/143; 422/220; 422/311
(58) Field of Search ................ 422/143, 220, 422/311, 212, 213, 219

(56) References Cited

U.S. PATENT DOCUMENTS

| | | | | |
|---|---|---|---|---|
| 3,410,792 A | * | 11/1968 | Van Driesen et al. | 208/143 |
| 3,723,072 A | * | 3/1973 | Carson et al. | 208/146 |
| 5,076,908 A | | 12/1991 | Stangeland et al. | 208/148 |
| 5,589,057 A | | 12/1996 | Trimble et al. | 208/148 |
| 5,599,440 A | * | 2/1997 | Stangeland et al. | 208/148 |
| 5,603,904 A | * | 2/1997 | Bachtel et al. | 422/143 |

* cited by examiner

*Primary Examiner*—Hien Tran
(74) *Attorney, Agent, or Firm*—P. L. Prater

(57) ABSTRACT

The invention comprises an OCR catalyst reactor which includes passive spheres and catalyst particles having substantially the same size and separated on opposite sides of a distributor cone by a screen. The use of passive spheres of substantially the same size to the catalyst particles provides for a more uniform distribution of the gas liquid reactants charged into the reactor vessel. The screen is configured such that it provides a separation of the catalyst and the passive spheres while being sized to prevent plugging.

6 Claims, 3 Drawing Sheets

BALANCED FLOW RESISTANCE OCR DISTRIBUTOR CONE

CROSS-REFERENCE TO RELATED APPLICATION

This application claims priority from and the benefit of U.S. Provisional Application Serial No. 60/069,000, filed Dec. 30, 1997, the specification of which is incorporated herein by reference for all purposes.

FIELD OF THE INVENTION

The present invention relates to hydrocarbon processing. In particular, the present invention relates to hydrocarbon processor reactor designs which employ onstream catalyst replacement (OCR).

BACKGROUND OF THE INVENTION

Hydrocarbon processing utilizes catalyst materials to speed up or alter the composition of a product stream. These reactors are costly to operate, especially for the downtime where all the catalysts must be replaced. Catalysts that tend to be used with the heavier-end or more contaminated portion of the crude oil, such as processing of residuum, vacuum gas oil (VGO) feed or materials having high concentrations of catalyst poisons such as nitrogen and sulfur based compounds as well as heavy metals, require more frequent and expensive downtime for catalyst change-out.

A process to handle this on a continuous basis called "OCR" is highlighted in U.S. Pat. Nos. 5,589,057; 5,599,440; 5,603,904; 5,076,908; and the like. Each of these preceding patents are completely incorporated herein by reference for all purposes. In general, the OCR process involves a reactor having a cone or screen at the bottom thereof to support the catalyst. The catalyst's stream enters at the top of the reactor counter-current to the flow of the gas and the hydrocarbon which enters at the bottom. As the feed moves up through the catalyst and contaminants are retained on the catalyst, these particles become heavier and move downward through the reactor towards the entering products stream and are finally withdrawn at the bottom of the reactor. The extracted catalysts can either be reintroduced at the top of the reactor directly, or mixed with fresh catalyst and introduced at the top of the reactor, or reprocessed and injected alone or in combination with fresh catalyst at the top of the reactor, or combinations thereof. This process permits the reactor to run on a longer or continuous basis without downtime for catalyst change-outs. The heavier the feed or the more contaminated the feed, the greater the charge of new catalyst and/or the faster the cycle times downward through the reactor are adjusted to achieve the desired product stream output.

Present OCR design employs passive (non-catalytic) spheres beneath the distributor cone in order to provide for a laterally uniform liquid and gas flow to the moving catalyst bed. The passive spheres thus far used in commercial reactors have been significantly larger than the active catalyst spheres in the OCR. This was thought to help support the cone as well as prevent catalyst loss and screen plugging of the distributor cone at the interface between the catalyst and the product stream introduction. Because of the size, mainly width, of the OCR distributor cone diameters (generally greater than or equal to 4.4 meters) and cone angles of about 60 degrees or greater, the larger packing below the cone causes preferential liquid and gas flow towards the region of least resistance to the flow, namely, the walls of the OCR reactor. This creates poor distribution of the liquid and gas products stream which results in lower product conversion or poor product uniformity. Reactor hot spots are another undesirable result of distribution problems.

Thus, it would be highly desirable to have a reactor capable of achieving more uniform flow across the catalyst bed, i.e., across the diameter of the reactor, especially at the point of the inverted cone.

SUMMARY OF THE INVENTION

The invention involves packing the region beneath the distributor cone where the feed and gas enter the reactor with passive spheres having substantially the same diameter as the active catalyst particles above the distributor cone. This ensures a more even distribution of the liquid and the gas through the cone since all the flow paths will have the same resistance. This is achievable even without plugging of the distributor cone screen. However, since the passive packing spheres will be the same size as the catalyst particle, screen designs are utilized in combination with the like-sized passive spheres to ensure that the passive spheres do not clog, i.e., become wedged in the underside of the prior art screen.

Thus, the invention includes a reactor having a distributor cone substantially at one end thereof and including catalyst particles contacting the interior of a distributor cone screen and passive spheres of like size to the catalyst particles contacting the opposite side of the distributor cone, wherein the distributor cone screen separating the catalyst particles from the passive spheres presents openings thereto shaped to preclude the entry of the catalyst or passive spheres within the opening in a plugging orientation. The gas and liquids are withdrawn or optionally recycled after passage through at least a portion if not all of the catalyst material.

DETAILED DESCRIPTION OF THE INVENTION

Figure 1:
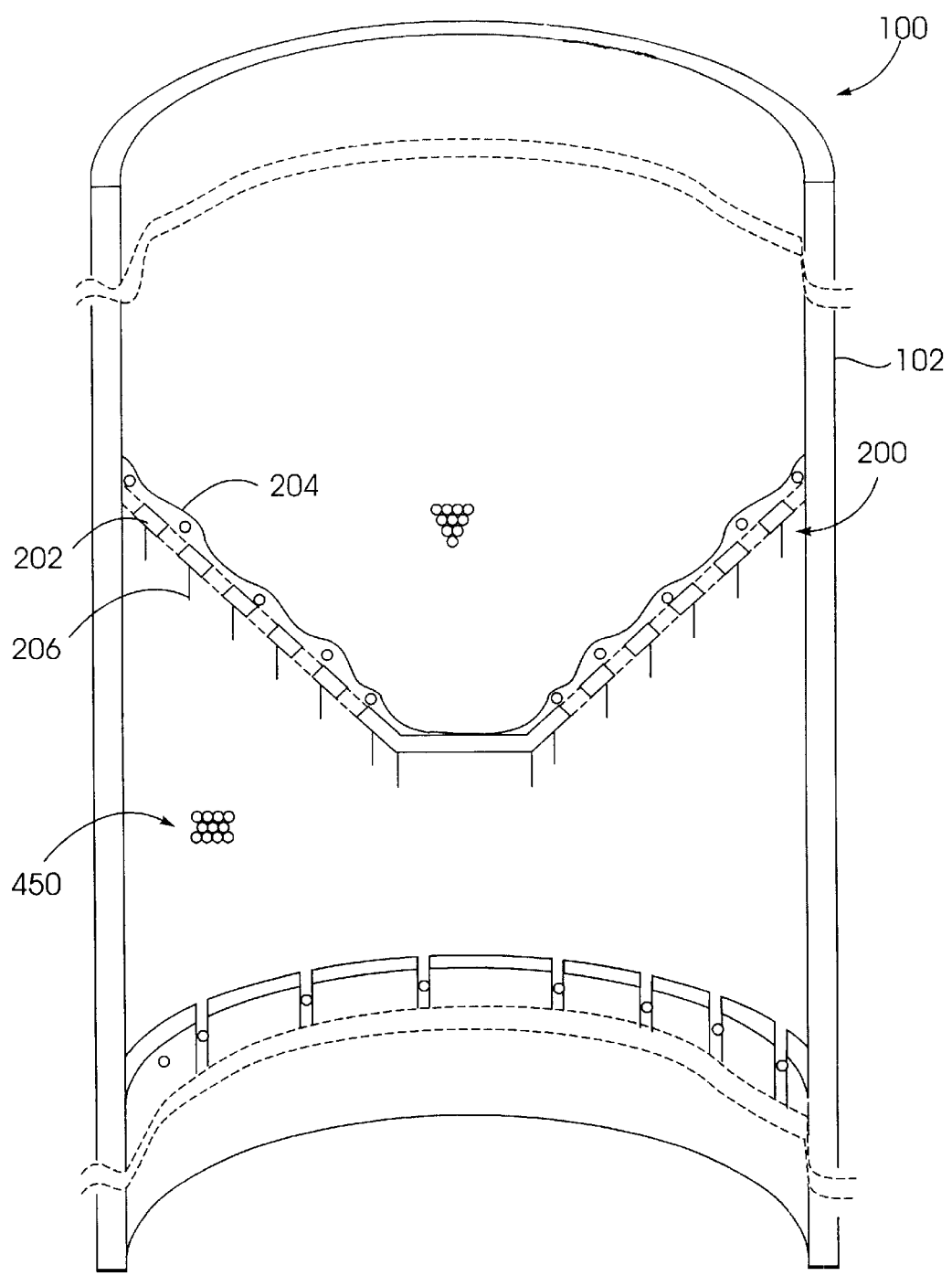
FIG. 1 is a partial cross sectional view of that portion of a reactor embodying the invention.
Figure 2A:
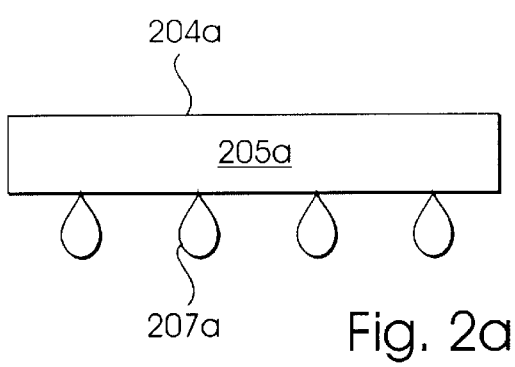
FIGS. 2a–f are cross sections of screens useful in the invention.
Figure 2B:
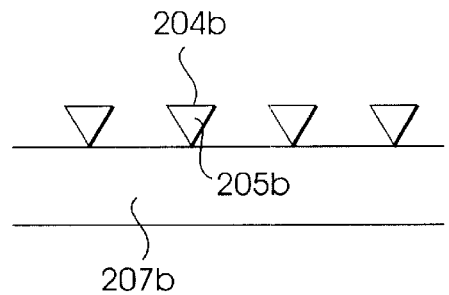
Figure 2C:
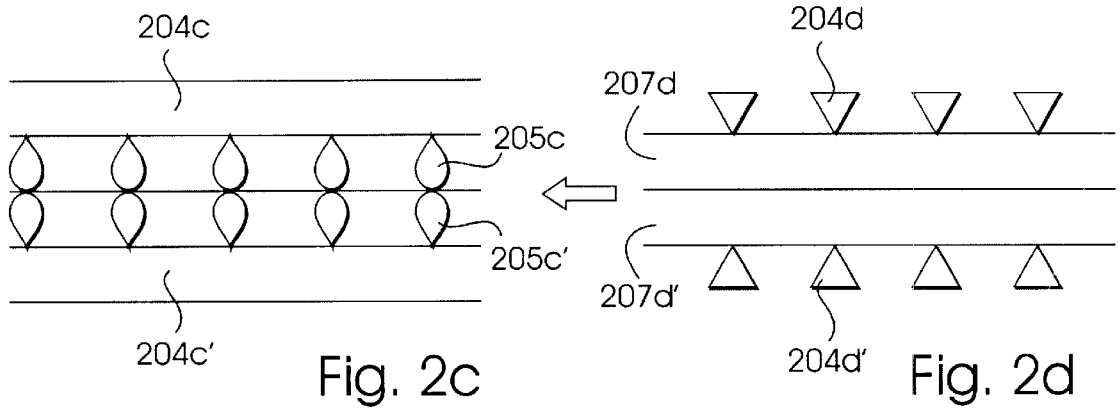
Figure 2D:
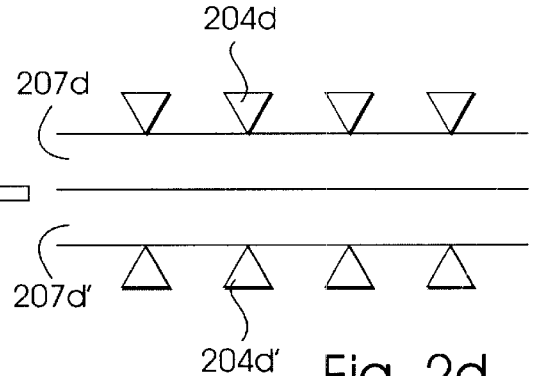
Figure 2E:
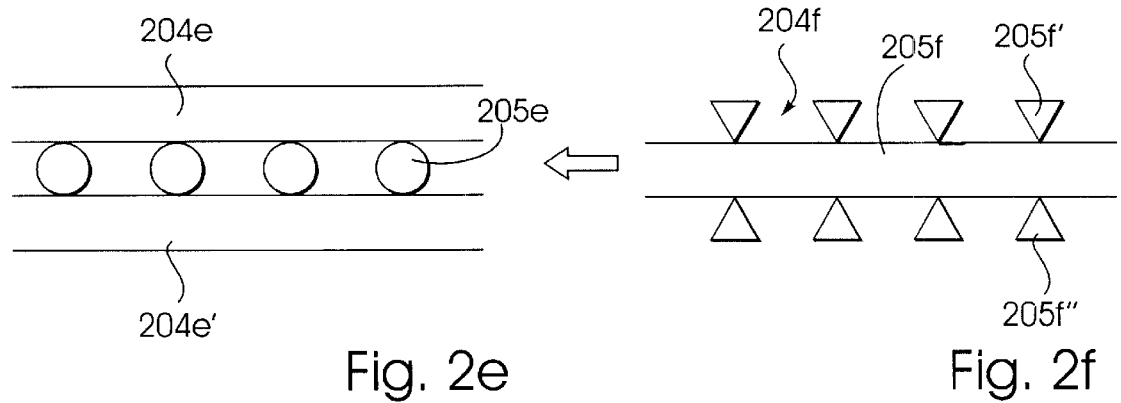
Figure 2F:
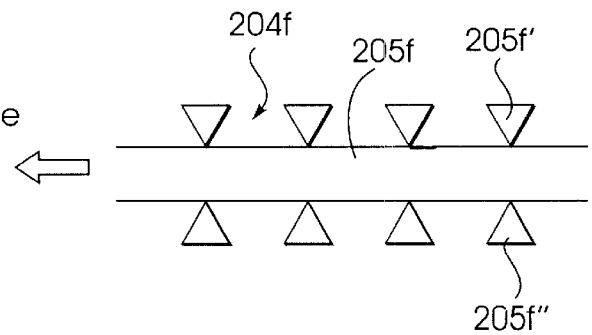
Figure 3:
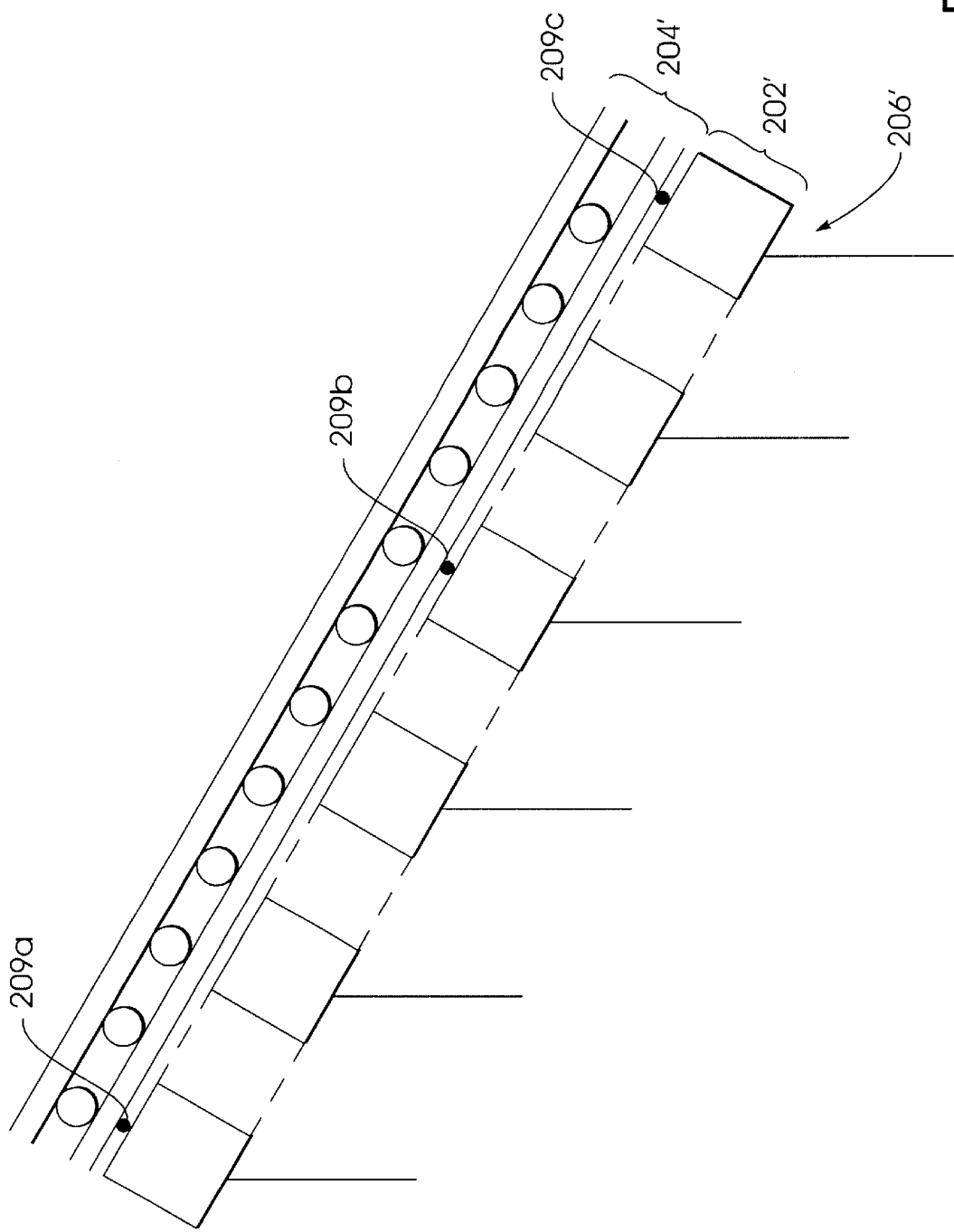
FIG. 3 is a section of a cross section of a particularly preferred embodiment of the distributor cone screen combination of FIG. 1 including a particularly preferred screen from FIG. 2.

Particularly preferred embodiments of the invention are illustrated and referenced in FIGS. 1, 2 and 3. One preferred embodiment of the invention avoids the problem of plugging of the screen affixed to the distributor cone by using a dual Johnson screen sandwich that involves two Johnson screens overlaying each other with their smooth opening sides facing the catalyst and passive spheres, respectively. In this particularly preferred embodiment the smooth smaller openings facing the catalyst 300 and passive spheres 400, respectively, prevents the respective particles from entering the adjacent regions of the distributor cone, i.e., the passive particles from entering the moving catalyst bed and contaminating the catalyst concentration and the catalyst from mixing with the passive spheres. In general, any structure capable of permitting the gas and liquid to flow therethrough to make contact with the catalyst while precluding the passive gas and liquid dispersing spheres, i.e., the passive particles or passive spheres from entering the openings therebetween is suitable for use in the invention. Of course, the openings are adjusted in conjunction with the size of the catalyst spheres which are matched by the passive spheres.

An alternative embodiment involves utilizing passive spheres of increasingly smaller size approaching the reactor walls so that the gas and liquid is more uniformly distributed throughout the reactor because of the drop-off in the flow rate of the gas and liquid approaching the reactor walls in light of the larger diameter at the base of the inverted cone.

FIG. 1 illustrates a reactor 100 having a wall 102 with an enlarged section surrounding the inverted distributor cone screen combination 200. In particular, the cone/screen combination includes the distributor cone 202, the screen 204, and gas flow directing skirts 206. The cone is affixed within the reactor and the screen attached thereto in accordance with methods known in the prior art, such as described and illustrated in U.S. Pat. Nos. 5,589,057; 5,599,440; and 5,603,904. The reactor further includes catalyst particles 300 and non-reactive passive spheres 400 on opposite sides of the distributor cone screen combination 200. Suitable passive sphere and catalyst sizes are from about 1/64" to about 1/2" with a preferred range of from about 1/32" to about 1/4". The screen openings are somewhat less than the passive sphere and catalyst diameters. Suitable catalysts of U.S. Pat. No. 5,599,440 include the catalysts at Col. 35, line 7, through Col. 39, line 59, completely incorporated herein by reference. Suitable hydrocarbon streams include residuum, VGO, and crude petroleum. Suitable passive spheres include the inorganic and not catalytically active supports of the catalysts or any non-catalytically active material which does not add impurities into the system.

Particularly preferred screen combinations are illustrated in FIG. 2a through f. The most particularly preferred design is FIG. 2d, which is inverted Johnson screens abutting each other and presenting the smaller openings to the catalyst and passive spheres, respectively. Suitable screens are taught in U.S. Pat. No. 3,723,072 and U.S. Ser. No. 08/624,195; the patent and application are completely incorporated herein by reference for all purposes. More particularly, Screen 204a includes a bar 205a and a rod cross section 207a. Screen 204b includes a triangular bar cross section 205b and a rod bar 207b. FIG. 2c bar abutting screens of FIG. 2a including elements 204c 204c', 205c and 205c' while FIG. 2d illustrates abutting screens of FIG. 2b. To save material, embodiments 2e and 2f include screens 204e and 204f, respectively, which include a single rod cross section element 205e or 205f affixed on opposite sides with the screen element 204e and 204e' and 205f and 205f''.

FIG. 3 is a portion of the distributor cone screen element or combination 200. It includes the screen 204' and particularly preferred screen of 204e of FIG. 2 welded to the cone 202' at 209a, b and c, respectively, with the liquid gas skirts 206' affixed to the cone 202' opposite to the side contacting the screen. Although the invention has been described with respect to particularly preferred embodiments, modifications which would be obvious to one of ordinary skill in the art are contemplated to be within the scope of the invention. The benefits of this design provide for more uniformity of temperature and flow within the reactor vessel without impeding the operation of the onstream catalyst replacement.

The invention, for which present protection is sought, appears in the appended claims. The description of the invention has been described with respect to particularly preferred embodiment. Modifications and extensions of the invention and claims which are obvious to the ordinary skilled artisan are contemplated to be within the scope of the invention. For example mixture combinations of screens such as FIG. 2a and 2b can be employed. The reactor can be used with a hydrocarbon or carbon-based feed other than VGO.

What is claimed is:

1. A gas fluid reactor comprising: a closed tubular vessel, in which a distributor cone, catalyst particles, and passive particles having no catalytic activity are located, wherein the distributor cone is situated at an end opposite to a point in which catalyst particles enter the vessel and adjacent to the point into which gas and liquid reactants are charged, the distributor cone including a screen element, the screen element being a Johnson screen sandwich composed of two Johnson screens, each having a smooth side, overlaying each other, the smooth side of one screen facing the catalyst particles and the smooth side of the other screen facing the passive particles, the screen element separating the catalyst particles on one side of the screen element from a plurality of passive particles on the other side of the screen element wherein the catalyst particles and passive particles are of substantially the same diameter.

2. The reactor according to claim 1 wherein the catalyst particles and the passive particles have a diameter of from about 1/64 inch to about 1/2 inch.

3. The reactor to claim 1 wherein the reactor is an on stream catalyst replacement (OCR) reactor.

4. The reactor of claim 1, wherein the catalyst particles and the passive particles are in the shape of spheres.

5. A gas fluid reactor comprising a closed tubular vessel in which a distributor cone, catalyst particles, and passive particles having no catalytic activity are located, wherein the distributor cone is situated at an end adjacent to the point into which gasses and liquids are charged, the improvement comprising: the distributor cone including a screen element which separates a plurality of catalyst particles from a plurality of passive particles, wherein the catalyst and passive particles are substantially the same diameter and wherein the screen element is a Johnson screen sandwich which is composed of two Johnson screens, each having a smooth side, overlaying each other, the smooth side of one screen facing the catalyst particles and the smooth side of the other screen facing the passive particles.

6. The reactor according to claim 5 wherein the catalyst particles and the passive particles have a diameter of form about 1/64 inch to about 1/2 inch.

* * * * *